H. FREDRICKS.
AUTOMATIC TRAIN PIPE COUPLING.
APPLICATION FILED DEC. 30, 1912.
1,082,941.
Patented Dec. 30, 1913.
3 SHEETS—SHEET 3.
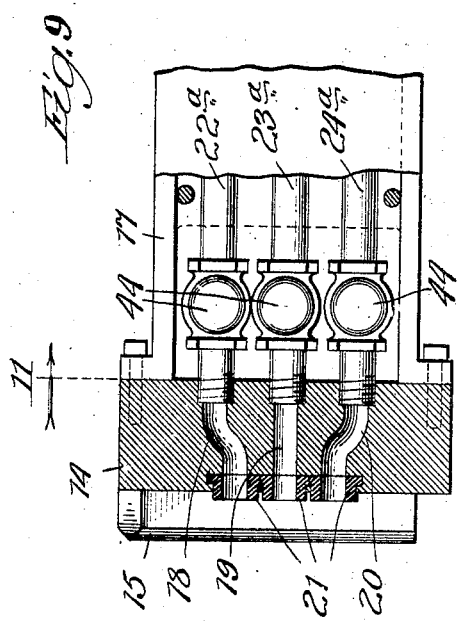
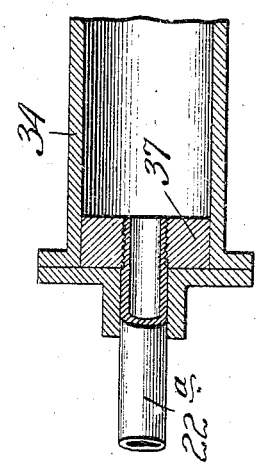
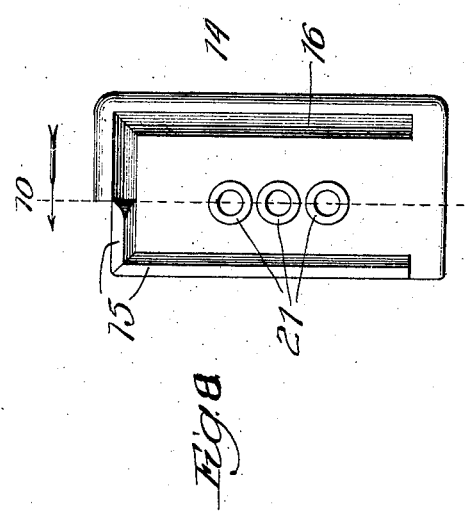
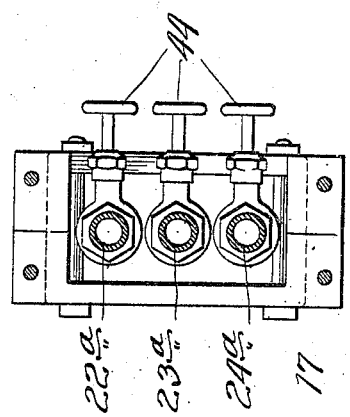
Witnesses:
Inventor,
Hans Fredricks,

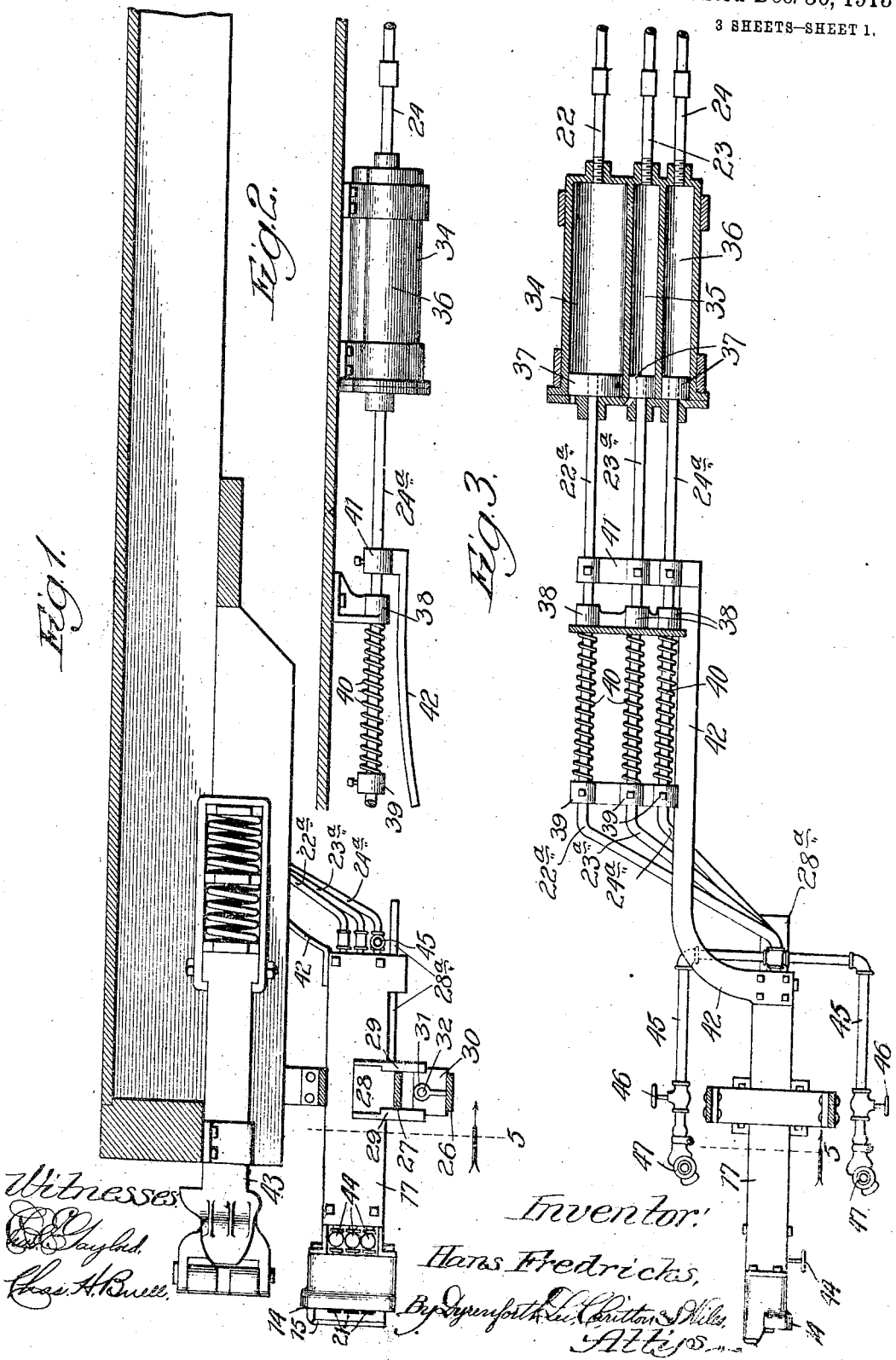

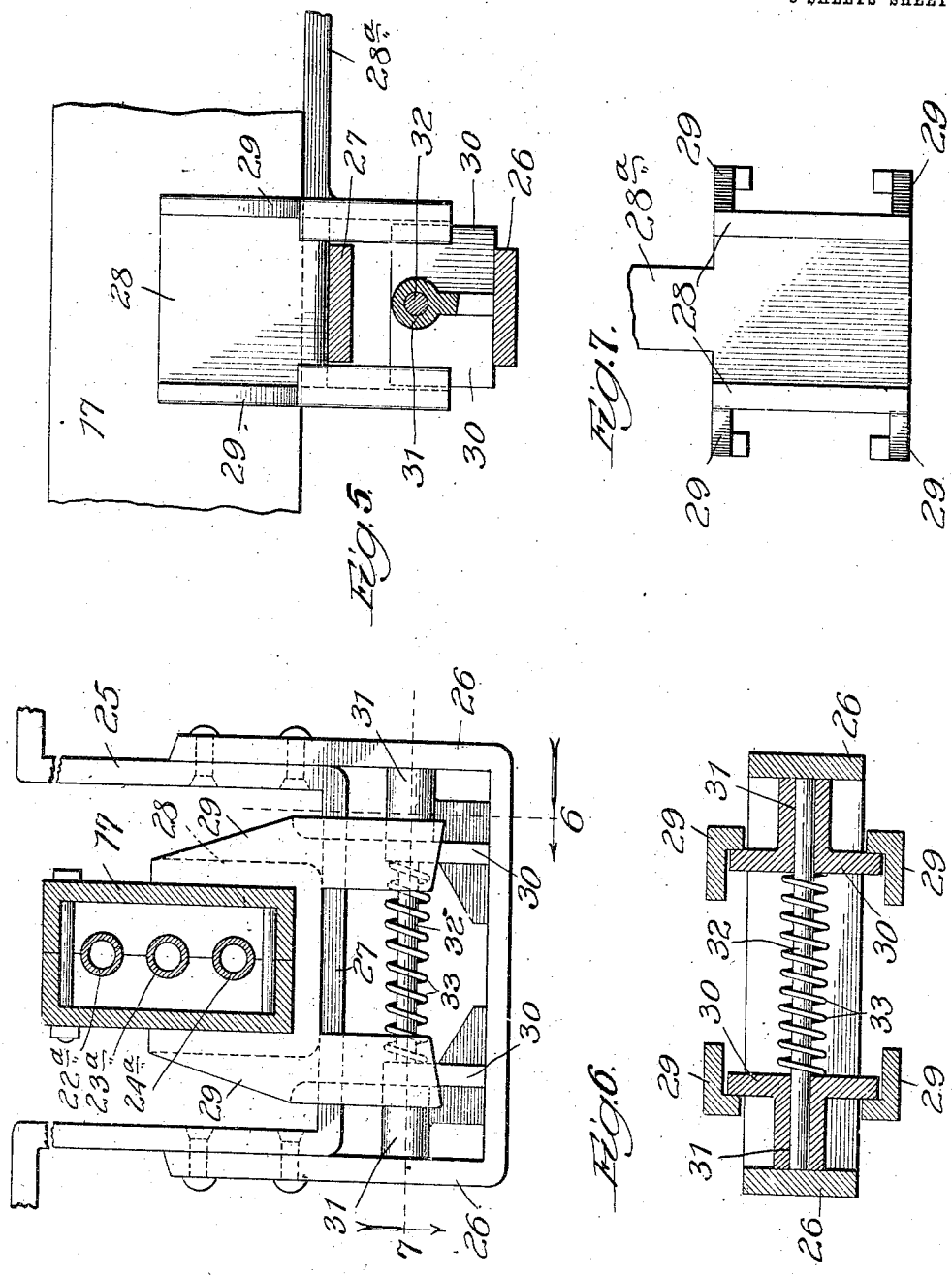

UNITED STATES PATENT OFFICE.

HANS FREDRICKS, OF FORT MADISON, IOWA.

AUTOMATIC TRAIN-PIPE COUPLING.

1,082,941.   Specification of Letters Patent.   Patented Dec. 30, 1913.

Application filed December 30, 1912. Serial No. 739,330.

*To all whom it may concern:*

Be it known that I, HANS FREDRICKS, a citizen of the United States, residing at Fort Madison, in the county of Lee and State of Iowa, have invented a new and useful Improvement in Automatic Train-Pipe Couplings, of which the following is a specification.

My invention relates to improvement in the construction of automatic train-pipe couplings; my object being to provide certain improvements in the construction of the coupling-heads and attendant parts, with a view, more especially, to insuring the maintenance of tight joints between the coupling-members under all normal conditions, and of dispensing with the use of flexible hose-sections between cars.

In the accompanying drawings, which show my improvements applied to a coupling-member for the steam-heating, air-brake, and air-signal pipes of a car—Figure 1 is a longitudinal section of an end-portion of a car underframe, equipped with my improved coupling, a part of the latter only being shown in side elevation; Fig. 2, a view in side elevation of other features of the coupling equipment; Fig. 3, a partly sectional plan view of the entire coupling equipment at one end of the car; Fig. 4, an enlarged section taken on line 5 in Fig. 3; Figs. 5 and 6, sections taken respectively on lines 6 and 7 in Fig. 4; Fig. 7, a plan view of a yoke in which the coupling-head is slidably supported; Fig. 8, an end, or face, view of the coupling-head; Fig. 9, a section taken on line 10 in Fig. 8; Fig. 10, a section taken on line 11 in Fig. 9; and Fig. 11, an enlarged section of one of three cylinders forming part of the construction.

The reference numeral 14 designates a coupling-head provided on its end face, at one side, with a tongue 15 which also extends half way across the top and is adapted to enter and engage an L-shaped groove 16 in a companion coupling-member of similar construction carried by the adjacent car of a train. The coupling-head is formed of a solid block on the end of a shank 17, as shown in Fig. 10, and extending through the block are ports 18, 19 and 20 surrounded in the face of the head with preferably rubber jointing-gaskets 21. Joined to the ports 18, 19, 20 are an air-brake pipe-section $22^a$, an air-signal pipe-section $23^a$, and a steam-pipe section $24^a$ which extend longitudinally through the shank 17.

Secured to the car underframe is a stirrup or bracket 25 carrying a lower stirrup or bracket 26, as shown in Fig. 5. Resting upon the lower horizontal bar 27 of the stirrup 25 is a yoke 28 having four downwardly-extending legs 29 straddling the bar 27. Resting in the stirrup 26 is a pair of blocks 30 having openings 31 at which they receive and slide along a guide-rod 32. Surrounding the rod 32 and confined between the blocks 30 is a spring 33 which tends normally to press the blocks away from each other against the sides of the stirrup 26. The legs 29 are flanged, as shown in Fig. 7, and fit over and engage the blocks 30. The coupling-member rests at its shank 17 in the yoke 28, which forms a support for the coupling-member in which it is longitudinally slidable. Forming an integral part of the yoke 28 is a backwardly extending platform, or tail-piece, $28^a$, serving to enlarge the bearing-surface on which the shank 17 rests and slides. The spring 33 tends to center the coupling-member in the supporting stirrup, and the construction permits the coupling-member to shift laterally a limited distance against the resistance of the spring 33, as when the train is rounding a curve.

The main train-pipes 22, 23, 24 terminate in cylinders 34, 35, 36, and on the rear ends of the pipe-sections $22^a$, $23^a$, $24^a$ are pistons 37 working in the said cylinders, as shown in Fig. 3. Between the cylinders and the shank 17 the pipe-sections $22^a$, $23^a$, $24^a$, which are of metal, pass loosely through guides 38 secured to the car underframe; and on the said pipe-sections are collars 39. Surrounding the pipe-sections and confined between the collars 39 and guides 38 are springs 40, which tend to hold the pipe-sections and coupling-member yieldingly in the forward position indicated in Fig. 3. Fastened to the pipe-sections $22^a$, $23^a$, $24^a$ is an arm 41 on the end of a brace-bar 42 which is secured to the end of the shank 17. The pistons 37 have central perforations registering with the pipe-sections $22^a$, $23^a$, $24^a$ by which they are carried. Air and steam traversing the train-pipes fills the cylinders 34, 35, 36 and tends to press the pistons 37 to the ends of the cylinders, as illustrated in Fig. 3. When two cars are coupled together by the car-coupling 43 (shown in Figs. 1 and 4) the companion pipe-coupling heads 14 engage and yield against the resistance of the springs 40 and against the fluid pressure, in the cylinders. The air and steam pressures in the cylinders against the pistons 37 thus supplement the action of the springs 40 in holding the meeting faces of the coupling-heads together and maintaining tight joints at the meeting faces of the gaskets 21.

Each of the pipe-sections 22ª, 23ª and 24ª is provided with a valve 44 near the outer end of the shank 17, by means of which the pipes may be closed by hand when the coupling members are to separate. Extending from each of the pipe-sections 22ª, 23ª and 24ª is a short metal pipe 45 having a valve 46 and a hose-coupling 47 for use when the car is to be coupled to another car which is unequipped with my improved pipe-coupling.

It will be understood that the air-brake, air-signal and steam pipes are brought together between cars by the mere act of coupling the cars together by means of their couplers 43. As members 14 come together they yield against the resistance of the springs 40, and when air and steam are turned into the train-pipes the pressure thereof in the cylinders 34, 35 and 36, against the pistons 37 supplements the pressure of the springs 40, to hold the meeting faces of the gaskets 21 tightly together, during all the travel of the drawbars of the couplers 43. The greater the air or steam pressure tending to cause leakage between coupling members, the greater the pressure in the cylinders against the pistons which holds the meeting-faces of the coupling-members together. The tongue and groove engagement of the meeting-faces of the coupling members, prevents relative lateral shifting thereof, and the supports at the stirrups 25 permit the necessary play of the members, under changes in angle between cars, as when the train rounds a curve.

The construction shown and described is particularly strong and durable and employs comparatively few parts. Furthermore, it dispenses with the use of the troublesome and expensive hose-sections between cars.

The foregoing description is intended to convey a clear understanding of my improvements in what I now believe to be the best form of their embodiment, and no undue limitation should be understood therefrom. It is my intention to claim all that is novel in my invention, and that the claims shall be construed as broadly as the prior state of the art may warrant.

What I claim as new, and desire to secure by Letters Patent, is—

1. A train pipe coupling comprising a head formed with openings, the head having a groove which extends part way around the front face and a rib extending around the other part of said face, resilient packing glands in the openings, a shank extending from the head, a support for the shank, pipes extending through the shank and communicating with the openings, pistons on the ends of the pipes, a fixed support through which the pipes pass, abutments on the pipes, springs interposed between the abutments and the fixed support, an arm connected to the shank and extending to the rear of the fixed support and secured to the pipes, cylinders in which the pistons fit, and supply pipes communicating with the cylinders.

2. A train pipe coupling comprising a head formed with openings, a shank extending from the head, pipes extending through the shank and communicating with the openings, a support for the shank, said support including a yoke, a chair laterally slidable on the yoke and formed with a seat to receive the shank, said chair having depending legs, a frame depending from the yoke, a rod extending across the depending frame, blocks loosely mounted on the rod, said block having portions confined within the legs, a spring interposed between the blocks, a fixed support for the pipes, an abutment on the pipes, springs on the pipes between the abutments and the fixed support, an arm fixed to and extending from the shank, said arm being secured to the pipes in rear of the fixed support, pistons on the pipes, and cylinders in which the pistons operate.

3. A train pipe coupling comprising a head, a shank extending from the head, pipes communicating with the head and extending through the shank, an arm connecting the shank and pipes, pistons on the pipes, cylinders in which the pistons operate, springs for normally projecting the head and pipes toward the forward end of the car, a support for the shank including a yoke laterally slidable on the yoke, a chair having a seat to receive the shank, said chair having depending legs which straddle the yoke, a frame depending from the yoke, a rod extending across the frame, blocks loosely mounted on the rod and having flanges which are confined by the depending legs, and a spring on the rod and interposed between the blocks.

HANS FREDRICKS.

In the presence of—
FRANCIS N. WOLF,
L. R. TRAVERSE.